United States Patent

Borom et al.

[11] 3,759,101
[45] *Sept. 18, 1973

[54] COMBINED DEPTH GAUGE AND PNEUMATIC ANALOGUE DECOMPRESSION INSTRUMENT

[75] Inventors: Marcus P. Borom; Lyman A. Johnson, both of Schenectady, N.Y.

[73] Assignee: General Electric Company, Schenectady, N.Y.

[*] The portion of the term of the patent subsequent to Jan. 16, 1990, has been disclaimed.

[22] Filed: Sept. 16, 1971

[21] Appl. No.: 181,096

[52] U.S. Cl.................. 73/291, 73/432 R, 235/184
[51] Int. Cl........................ G01f 23/14, G06g 5/00
[58] Field of Search................. 73/432 R, 299, 300, 73/291, 406; 235/184

[56] References Cited
UNITED STATES PATENTS

| | | | |
|---|---|---|---|
| 3,121,333 | 2/1964 | Alinari | 73/299 |
| 3,377,860 | 4/1968 | Masters | 73/291 |
| 1,583,575 | 5/1926 | Coberly | 73/406 |
| 3,188,864 | 6/1965 | Dean | 73/300 |

*Primary Examiner*—S. Clement Swisher
*Attorney*—John F. Ahern et al.

[57] ABSTRACT

In this computer for calculating and indicating safe minimum-duration decompression schedules, a porous body serves the double purpose of supporting the gas diffusion membrane and providing a substantially constant gas chamber. Additionally, the immersible housing of the instrument has an integrally-formed depth gauge in the form of an arcuate rib portion having a tapered axial bore open only at its larger end. A single instrument dial serves both the computer gauge and the depth gauge in this coordinated assembly.

6 Claims, 3 Drawing Figures

Patented Sept. 18, 1973
3,759,101
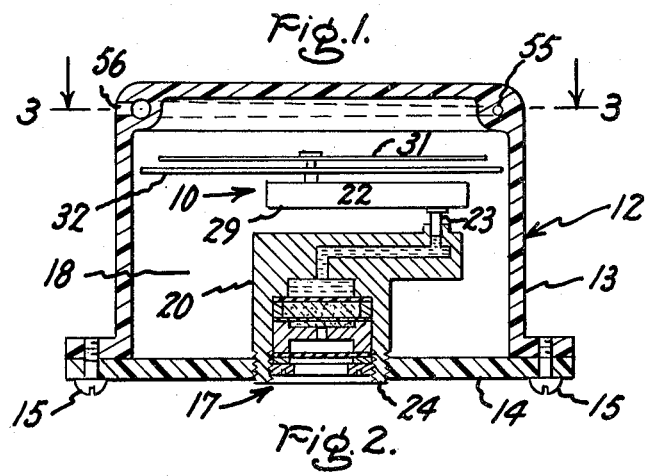
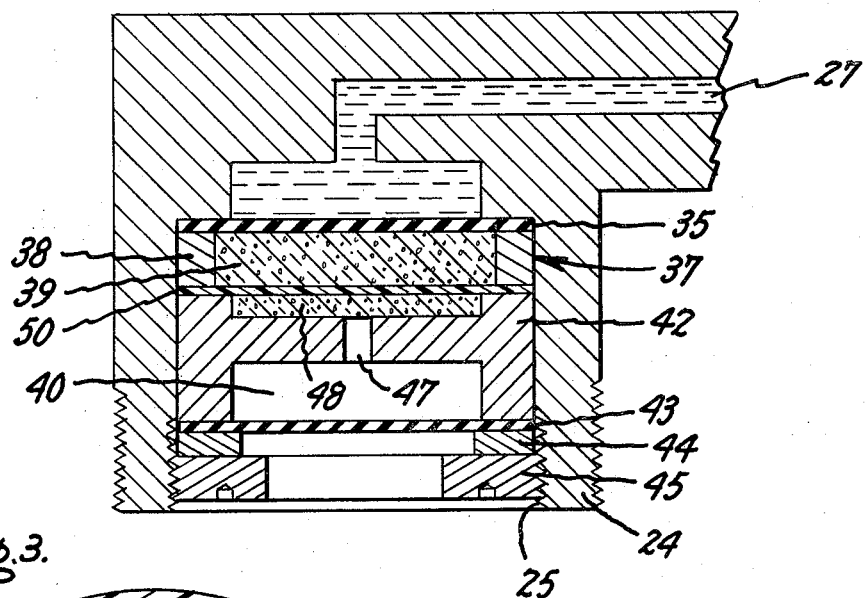
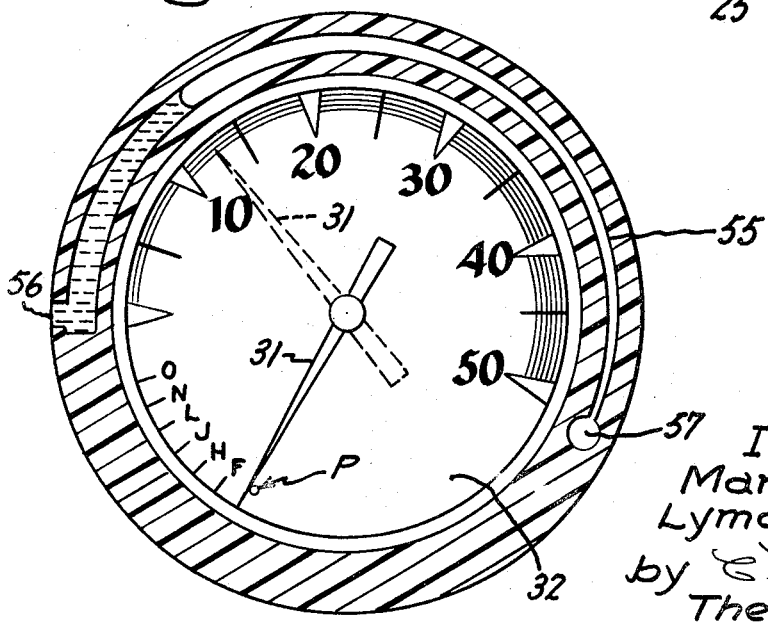
Inventors:
Marcus P. Borom,
Lyman A. Johnson,
by E.J. Wate
Their Attorney.

COMBINED DEPTH GAUGE AND PNEUMATIC ANALOGUE DECOMPRESSION INSTRUMENT

The present invention relates generally to the art of computing decompression schedules and is more particularly concerned with a novel pneumatic analogue decompression instrument which continuously senses ambient pressures experienced during hyperbaric exposure and computes and indicates a minimum-duration safe decompression schedule.

CROSS REFERENCES

This invention is related to those of the following four patent applications assigned to the assignee hereof and filed of even date herewith:

U.S. Pat. application Ser. No. 181,048, filed Sept. 16, 1971, entitled, "Pneumatic Analogue Decompression Instrument," in the name of Marcus P. Borom, which discloses and claims the concept of using a permselective membrane to simulate the gas-diffusion characteristics of body tissues as they take up the gas of the breathing mixture and release it as ambient pressure varies.

U.S. Pat. application Ser. No. 181,107, filed Sept. 16, 1971, entitled, "Multi-Time Constant Pneumatic Analogue Decompression Instruments," in the names of Lyman A. Johnson and Marcus P. Borom, which discloses and claims the concept of matching different time-constants of various body tissues with membrane chambers of different diffusion controlled time-constant characteristics to provide a versatile decompression meter.

U.S. Pat. application Ser. No. 181,099, filed Sept. 16, 1971, entitled, "Single Gauge Multi-Time Constant and Multi-Tissue Ratio Automatic Decompression Instruments," in the names of Marcus P. Borom and Lyman A. Johnson, which discloses and claims the concept of connecting several different time-constant membrane assemblies in an automatic switching relation with a single gauge so that the gauge always indicates the highest pressure prevailing anywhere in the system.

U.S. Pat. application Ser. No. 181,106, filed Sept. 16, 1971, entitled, "Miniaturized Automatic Decompression Meters," in the names of Marcus P. Borom and Lyman A. Johnson, which discloses and claims the combination of a constant-volume gas chamber and a liquid-filled gauge which enables miniaturization without impairing performance of the instrument.

BACKGROUND OF THE INVENTION

The major hazard faced by both commercial and sport divers is decompression sickness which results from the release of dissolved gases from the body tissues as discrete bubbles when the ambient pressure is reduced too rapidly. As the ambient pressure is increased during a dive, the body tissues begin to absorb more gas from the breathing mixture to equilibrate with this pressure change. The rate of such equilibration varies from tissue to tissue, but not significantly from person to person, nor between compression and decompression phases, and is vitally important only in the course of return from hyperbaric exposure. Also, the tissues can withstand, to varying degrees, an internal over-pressure (i.e., supersaturation) during decompression without nucleating gas bubbles. This is referred to as a tissue ratio and is given by the expression Tissue ratio = Safe maximum tissue pressure/ambient pressure with the pressures given on an absolute scale. The rate of descent, therefore, is a matter of the diver's choice while the rate of ascent is limited by a combination of the tissue ratio and the rate at which the dissolved gases enter the bloodstream in the dissolved state and are removed from the body through the lungs.

Boycott, Damant and Haldane ["The Prevention of Compressed-Air Illness," J. Hygiene, 8, 342–443 (1908)] proposed that the body tissues can be considered to be gas-diffusion chambers arranged in a parallel circuit with each chamber having a characteristic tissue half time and tissue ratio.

On the basis of their model, Boycott, et al. proposed a radical departure from the conventional continuous decompression schedules which became known as "stage" decompression. Today their model forms the basis for the modern decompression schedules as set forth in the Standard Navy Decompression Tables. These Tables have been computed using tissue half times of 20, 40, 80 and 120 minutes and tissue ratios from 2.5/1 to 1.8/1. These Tables are designed for fixed mission dives, that is, dives to a predetermined depth for a predetermined time. Consequently, they are not suitable for the majority of commercial and sport dives since they prescribe a longer-than-necessary decompression schedule as the alternative to hazarding an estimate compensating for depth excursions during a dive.

Recognizing the need for a better answer to the problem, the prior art provided decompression meters having input, computation and read-out components of various kinds. In these devices, however, computation is accomplished by the resistive flow of a gas through an orifice or a porous medium which follows the mathematics of Poiseuille flow and not diffusion through a membrane. These devices, then, share the characteristic of inability to compute minimum-duration safe decompression schedules according to the Boycott, et al. model. Thus, because of Poiseuille flow, tissue gas uptake and release actions are not computed according to the expression used in developing the accepted decompression tables. The use of a diffusion membrane provides the precise analogue to these expressions.

SUMMARY OF THE INVENTION

The decompression meter of this invention makes double use of one element of structure of the versatile instruments of the aforementioned related patent applications. Additionally, it incorporates in accordance with the novel concept hereof in one instrument both the decompression schedule computing and indicating means with the depth gauge which is coordinated for read-out on the same dial. The double-use concept and the coordinated double-gauge feature afford net substantial advantages over the instruments heretofore known of this kind and at the same time they do not in any way limit utility or operation of the instrument or otherwise incur or involve substantial offsetting penalty or disadvantage.

DESCRIPTION OF THE DRAWINGS

The novel features and advantages of the instruments of this invention will be more clearly apparent from the detailed description set forth below taken in conjunction with the drawings accompanying and forming a part of this specification, in which:

FIG. 1 is a vertical sectional view of an instrument embodying this invention in a preferred form;

FIG. 2 is an enlarged, vertical sectional view of the body portion of the instrument of FIG. 1 showing the ambient-pressure sensing computing means and elements of the indicator means in assembled, operative relation; and FIG. 3 is a sectional view of the instrument of FIG. 1 taken on line 3—3 thereof to illustrate the coordinated relationship between the capillary depth gauge tube and the instrument dial.

DESCRIPTION OF THE INVENTION

Self-contained instrument 10 of FIGS. 1 and 2 is enclosed in a housing 12 comprising a cover 13 in the form of a flanged cup-like body and a bottom plate 14 secured to cover 13 by bolts 15 through the flange of cover 13. The cover and bottom plate are made of transparent plastic having the physical strength to withstand the pressures encountered at diving depths. Plate 14 has a threaded axial aperture 17 providing access to instrument compartment 18 in the housing.

Instrument 10 includes an L-shaped metal body 20 and gauge assembly 22 supported by conduit 23 secured to body 20 which is supported within the housing by threaded engagement at its lower end 24 with bottom plate 14. An enlarged axial bore is provided in the lower end of body 20 to receive components of the ambient pressure-sensing means, the computing means and the indicator means of instrument 10, and threads 25 are provided within the lower open end of the body. A bore 27 of reduced diameter connects the inner end of the enlarged bore cavity with the upper end of body 20 where it communicates with conduit 23.

Bourdon tube 29 of gauge assembly 22 communicates with bore 27 through conduit 23 and as indicated in the drawings, the volume thus provided is liquid-filled. The bourdon tube is connected to indicator 31 and instrument dial 32 so that when pressure of liquid within tube 29 is changed, indicator 31 is caused to move relative to dial 32 and thereby show the pressure change on the dial.

The liquid within bourdon tube 29, conduit 23 and bore 27 is sealed against leakage into the enlarged bore portion of body 20 by diaphragm 35 of natural rubber. Diaphragm 35 is held in place by disc 37 which includes a metal ring 38 and a porous ceramic cylinder 39 which fills the space within the ring and provides the volume serving as the time-constant chamber of the computing means.

Ambient-pressure gas chamber 40 of this instrument is provided by metal cylinder 42 and a rubber diaphragm 43 which closes the lower open end of cylinder 42 and is held in place by washer 44 and compression nut 45. Cylinder 42 has a central portion through which a small diameter aperture 47 opens into a recess in the top of the cylinder in which a porous ceramic disc 48 is disposed. A silicone rubber membrane 50 of about 10-mils thickness is disposed between the upper surface of cylinder 42 and disc 48 and the opposed lower surfaces of ring 38 and ceramic cylinder 39. Thus, diffusion membrane 50 is supported against gas pressure differentials by the fritted glass or other suitable porous ceramic of cylinder 39 and disc 48 and at the same time is effective to diffuse gas species in either direction between ambient-pressure gas chamber 40 and time-constant chamber 39.

As disclosed in copending U.S. Pat. application Docket No. RD-3993, the device of this invention may be provided in the form of the FIG. 3 instrument of that case for use in the breathing gas supply line of the diver instead of being self-sufficient. The reconstruction and modification of the device of FIGS. 1 and 2 hereof can suitably be substantially as shown and described in U.S. Pat. application Docket No. RD-3993, rubber diaphragm 43 being replaced suitably by a disc which is not deformed under conditions of intended use, and appropriate connection being made between the diver's breathing gas supply line (not shown) and ambient-pressure gas chamber 40.

It will also be understood by those skilled in the art that the particular membrane used for the gas-diffusion function of the instrument may be of material other than silicone rubber, the criteria for selection of alternative membrane materials being those set forth in the specification of copending U.S. Pat. application Docket No. RD-3993, the disclosure of which is incorporated herein by reference.

A capillary depth gauge 55 is provided in the form of a capillary bore in the upper portion of cover 13. The capillary bore opens through port 56 to the outside of cover 13 and is tapered over its length from port 56 to bulb 57 at its closed end, the length-diameter relationship enabling direct read-out of water depth in feet on dial 32. Housing 10, consequently, is positioned relative to dial 32 so that bulb 55 is located just beyond the 50-foot mark and aperture 56 is at the dial zero position.

MODE OF OPERATION

The mode of operation of the instruments of this invention generally resembles that of the copending U.S. Pat. application Docket No. RD-3993. Thus, as the volume of ambient-pressure gas chamber 40 fluctuates with changes in the water pressure applied to diaphragm 43, gas pressure in chamber 40 varies and influences the diffusion of gas through membrane 50. Pressure increase in chamber 40 resulting in gas diffusion into chamber 39 is shown on dial 32 as indicator 31 is actuated in response to displacement by diaphragm 35 of the liquid in bore 27 and bourdon tube 23. Likewise, a decrease in the pressure of gas in chamber 40 results in gas diffusion from chamber 39 through membrane 50 and a corresponding reduction in pressure shown by the gauge as diaphragm 35 returns to or toward the rest position illustrated by FIG. 2.

It will be understood in regard to FIG. 3 that the zero depth point on dial 32 represents 15 pounds-per-square-inch pressure. Consequently, before underwater use of considerable time after the instrument has been removed from the water following a dive, indicator 31 will rest against peg P representing possibly only a few pounds gauge pressure, i.e., 15 to 18 pounds absolute pressure. Then, as the instrument is subjected to hyperbaric pressure underwater, indicator 31 moves up the dial scale indicating the take-up of nitrogen or other gas (depending upon the species of the breathing gas mixture in chamber 40) by body tissue as represented by diffusion membrane 50. At the same time, water flows through port 56 into capillary bore 55, compressing air in the capillary in proportion to the water pressure at the depth of the instrument. After a considerable period during which diffusion of gas through membrane 50 results in movement of indicator 31 to the position outlined in FIG. 3, the depth gauge may likewise indicate a depth of 13 feet. Variations of readings between indicator 31 and the depth gauge will, however, normally occur during the large part of a diving period. For example, if a diver proceeds directly to a depth of about 50 feet from the surface, the capillary depth gauge will immediately register that depth against dial 32 but indicator 31 will at first not move off peg P and then later will move comparatively slowly up the scale until it reaches the depth at which the diver begins his decompression schedule of ascent to the surface. In this instance, the diver at 50 feet observing indicator 31 in the outlined position of FIG. 3, knows that he may safely proceed directly to the 13-foot depth level without a decompression stop. He then can approach the surface as the indicator moves toward the zero point on the scale, or he may proceed stepwise with one or more stops on the way up. The latter procedure will usually be preferred, however, when the initial decompression stop shown by the FIG. 3 instrument is at the 20-foot or deeper level.

The letter indicia on dial 32 (FIG. 3) correspond to the letters employed in the Standard Navy Decompression Tables for use in calculating the requirements of decompression and breathing gas supply for repetitive dive situations. In other words, after the diver has returned to the surface via a decompression schedule, indicator 31 moves from the zero position in the direction of peg P and points to one after another of the letter indicia, thus enabling the diver to determine quickly, before re-entry into the water, the "letter" condition of his body tissues which is related to the pressure of the residual absorbed gas in the tissues. Reference to the Standard Navy Decompression Tables for repetitive dives then permits the diver to make a critical allowance for such residual gas pressure in the tissue, particularly from the standpoint of scheduling the duration of the impending dive against the breathing gas supply available to him.

What we claim as new and desire to secure by Letters Patent of the United States is:

1. A decompression instrument which comprises,
   a. ambient pressure-sensing means including an ambient-pressure gas chamber;
   b. computing means for measuring continuously uptake and release of gas by human tissues under fluctuating hyperbaric ambient pressures including
      1. a porous body providing a substantially constant volume gas chamber,
      2. a gas-diffusion membrane supported by the porous body and disposed between and separating the ambient-pressure gas chamber and the constant volume gas chamber; and,
   c. indicator means including a gauge operatively associated with the computing means for indicating the appropriate decompression schedule in terms of hyperbaric pressures and time intervals.

2. The instrument of claim 1 including a second porous body disposed on the ambient-pressure gas chamber side of the gas-duffusion membrane and providing support for said gas-diffusion membrane.

3. The instrument of claim 1 in which the porous body is of ceramic material.

4. The instrument of claim 2 in which both porous bodies are of ceramic material.

5. In a decompression instrument, in combination,
   a. ambient pressure-sensing means including an ambient-pressure gas chamber;
   b. computing means for measuring continuously uptake and release of gas by human tissues under fluctuating hyperbaric ambient pressures;
   c. indicator means including
      1. a dial bearing indicia of water depths and repetitive dive groups of diving tables,
      2. a guage operatively associated with the computing means having an indicator for registry with the dial to show the appropriate decompression schedule of stop depths and times and the inert gas debt in body tissues influencing repetitive dives, and
      3. a capillary tube depth gauge coordinated with the dial for read-out.

6. The instrument of claim 5 including a housing having a transparent portion and a rib portion formed in the housing and containing the capillary tube depth gauge with its open end opposite the zero point of the linear scale of water depth.

\* \* \* \* \*